(12) United States Patent
Tsai et al.

(10) Patent No.: US 11,451,984 B2
(45) Date of Patent: Sep. 20, 2022

(54) RESOURCE MANAGEMENT METHOD, RESOURCE MANAGEMENT SYSTEM AND WORKLOAD SCHEDULING APPARATUS FOR NETWORK SLICING

(71) Applicant: Industrial Technology Research Institute, Hsinchu (TW)

(72) Inventors: Chang-Lan Tsai, Hsinchu County (TW); Wan-Yi Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 40 days.

(21) Appl. No.: 17/134,212

(22) Filed: Dec. 25, 2020

(65) Prior Publication Data
US 2022/0150723 A1   May 12, 2022

(30) Foreign Application Priority Data
Nov. 11, 2020   (TW) .................................. 109139262

(51) Int. Cl.
*H04W 4/00* (2018.01)
*H04L 5/14* (2006.01)
(Continued)

(52) U.S. Cl.
CPC ......... *H04W 24/02* (2013.01); *H04L 41/0896* (2013.01); *H04W 4/70* (2018.02);
(Continued)

(58) Field of Classification Search
CPC ....... H04W 24/02; H04W 4/70; H04W 16/22; H04W 24/10; H04W 28/0268; H04W 28/08; H04W 48/18; H04L 41/0896
(Continued)

(56) References Cited

U.S. PATENT DOCUMENTS 9,775,045 B2   9/2017 Li et al.
10,129,108 B2   11/2018 Vrzic
(Continued)

FOREIGN PATENT DOCUMENTS

CN   106954267   7/2017
CN   108235434   6/2018
(Continued)

OTHER PUBLICATIONS

"Search Report of Europe Counterpart Application", dated Jun. 18, 2021, pp. 1-15.
(Continued)

*Primary Examiner* — Mark G. Pannell
(74) *Attorney, Agent, or Firm* — JCIPRNET

(57) ABSTRACT

A resource management method, a resource management system, and a workload scheduling apparatus for network slicing are provided. In the method resource management, a service request related to an application type of a terminal device is received. A monitoring report of the terminal device is obtained according to the service request. The monitoring result relates to a condition of the radio resource used by the terminal device. A usage situation of a slicing resource is analyzed based on the slicing resource requested by the service request and the monitoring report to predict a predicted arrangement result of the slicing resource. The slicing resource requested by the service result is arranged according to the predicted arrangement result to transmit a corresponding setting configuration to the radio access network. The setting configuration serves to adjust the slicing resource. Accordingly, the request of the service and the current condition are fulfilled.

15 Claims, 6 Drawing Sheets

(51) Int. Cl.
  *H04W 24/02* (2009.01)
  *H04W 4/70* (2018.01)
  *H04L 41/0896* (2022.01)
  *H04W 16/22* (2009.01)
  *H04W 24/10* (2009.01)
  *H04W 28/02* (2009.01)
  *H04W 28/08* (2009.01)
  *H04W 48/18* (2009.01)

(52) U.S. Cl.
  CPC .......... *H04W 16/22* (2013.01); *H04W 24/10* (2013.01); *H04W 28/0268* (2013.01); *H04W 28/08* (2013.01); *H04W 48/18* (2013.01)

(58) Field of Classification Search
  USPC ........................................................ 370/329
  See application file for complete search history.

(56) References Cited

U.S. PATENT DOCUMENTS

| | | | |
|---|---|---|---|
| 10,178,646 | B2 | 1/2019 | Bosch et al. |
| 10,454,836 | B2 | 10/2019 | Shaw et al. |
| 10,536,946 | B2 | 1/2020 | Zhu et al. |
| 2017/0054595 | A1 | 2/2017 | Zhang et al. |
| 2017/0070892 | A1* | 3/2017 | Song .................. H04L 41/0896 |
| 2017/0141973 | A1 | 5/2017 | Vrzic |
| 2017/0367120 | A1* | 12/2017 | Murray ................ H04B 7/0695 |
| 2018/0077023 | A1 | 3/2018 | Zhang |
| 2018/0124661 | A1* | 5/2018 | Tsai ................ H04W 36/00835 |
| 2018/0132138 | A1* | 5/2018 | Senarath ................ H04L 47/78 |
| 2018/0262924 | A1 | 9/2018 | Dao et al. |
| 2019/0075512 | A1 | 3/2019 | Jin et al. |
| 2019/0123963 | A1 | 4/2019 | Tang et al. |
| 2019/0174498 | A1 | 6/2019 | Samdanis et al. |
| 2019/0207778 | A1* | 7/2019 | Qiao ...................... H04W 4/24 |
| 2019/0306754 | A1* | 10/2019 | Shan ..................... H04W 28/22 |
| 2019/0327317 | A1* | 10/2019 | Lu .......................... H04L 67/26 |
| 2019/0357136 | A1* | 11/2019 | Li .......................... H04W 48/18 |
| 2019/0372837 | A1* | 12/2019 | Yang .................. H04L 41/0806 |
| 2020/0022095 | A1* | 1/2020 | Kim ...................... H04W 72/10 |
| 2020/0022193 | A1* | 1/2020 | Ma .......................... H04W 4/06 |
| 2020/0053834 | A1 | 2/2020 | Dahan et al. |
| 2020/0077327 | A1* | 3/2020 | Duan ................... H04W 48/18 |
| 2020/0195495 | A1 | 6/2020 | Parker et al. |
| 2020/0329381 | A1 | 10/2020 | Chou et al. |
| 2020/0359440 | A1* | 11/2020 | Qiao ..................... H04W 76/11 |
| 2021/0037542 | A1* | 2/2021 | Wang .................... H04W 84/18 |
| 2021/0037588 | A1* | 2/2021 | Zhu ....................... H04W 36/26 |
| 2021/0084582 | A1 | 3/2021 | Li |
| 2021/0099976 | A1* | 4/2021 | Mueck .................. H04W 72/04 |
| 2021/0105308 | A1* | 4/2021 | Bouazizi ............ H04N 21/8456 |
| 2021/0144790 | A1* | 5/2021 | Faccin .................. H04W 60/00 |
| 2021/0274387 | A1* | 9/2021 | Kousaridas ........... H04W 24/10 |
| 2021/0314883 | A1* | 10/2021 | Latheef ............... H04W 52/365 |
| 2021/0368379 | A1* | 11/2021 | Xing ................... H04L 41/5009 |

FOREIGN PATENT DOCUMENTS

| | | |
|---|---|---|
| CN | 109600262 | 4/2019 |
| CN | 111867103 | 10/2020 |
| CN | 111884868 | 11/2020 |
| TW | 201720222 | 6/2017 |
| WO | 2017076086 | 5/2017 |
| WO | 2019068251 | 4/2019 |
| WO | 2020001171 | 1/2020 |

OTHER PUBLICATIONS

3GPP, "3rd generation partnership project; technical specification group services and system aspects;study of enablers for network automation for 5g(release 16)", 3GPP TR 23.791, Jun. 2018, pp. 1-32.

Kt, et al., "Machine learning in 5G and future networks: use cases and requirements", International Telecommunication Union, Mar. 2019, pp. 1-42.

Adlen Ksentini et al., "Toward Enforcing Network Slicing on RAN: Flexibility and Resources Abstraction," IEEE Communications Magazine, vol. 55, Issue 6, Jun. 13, 2017, pp. 102-108.

M. R. Raza et al., "Reinforcement Learning for Slicing in a 5G Flexible RAN," Journal of Lightwave Technology, vol. 37, No. 20, Oct. 15, 2019, pp. 5161-5169.

Vincenzo Sciancalepore et al., "RL-NSB: Reinforcement Learning-Based 5G Network Slice Broker," IEEE/ACM Transactions on Networking, vol. 27, Issue 4, Aug. 2019, pp. 1543-1557.

Haider Daami R. Albonda et al., "Reinforcement Learning-Based Radio Access Network Slicing for a 5G System with Support for Cellular V2X," International Conference on Cognitive Radio Oriented Wireless Networks, Jun. 2019, pp. 262-276.

O-Ran Alliance, "Add a new use case of NSSI resource allocation optimization," O-RAN WG1 Use Cases Detailed Specification v02.00, Mar. 23, 2020, pp. 1-7.

O-Ran Alliance, "Ran Slice SLA Assurance," ORAN-WG1.Use Cases Detailed Specification, Feb. 2020, pp. 1-12.

* cited by examiner

RESOURCE MANAGEMENT METHOD, RESOURCE MANAGEMENT SYSTEM AND WORKLOAD SCHEDULING APPARATUS FOR NETWORK SLICING

CROSS-REFERENCE TO RELATED APPLICATION

This application claims the priority benefit of Taiwan application serial no. 109139262, filed on Nov. 11, 2020. The entirety of the above-mentioned patent application is hereby incorporated by reference herein and made a part of this specification.

TECHNICAL FIELD

The disclosure relates to a resource management method, a resource management system and a workload scheduling apparatus for network slicing.

BACKGROUND

Network slicing is key to the fifth generation (5G) mobile communication. Network slice is a kind of logical network and includes a set of network functions and corresponding network resources to support a certain service request. The network functions may be classified into virtual network functions (VNF) and physical network functions (PNF). Resources which the network functions need include computing processors (for example, central processing units (CPU) or graphical processing units (GPU), and storage devices, and radio resources are also used to transceive information content with end users in both directions.

Based on the needs of different types of services, network slice may be classified into four categories, including: enhanced mobile broadband (eMBB) communications, suitable for applications of ultra-wideband, high-speed, and high-traffic; ultra-reliable and low latency communications (URLLC), suitable for applications requiring an extremely low latency and an extremely high accuracy, such as remote control, autonomous driving, telemedicine, etc.; massive machine type communications (mMTC), suitable for the Internet of Things (IoT), for example, for networking applications of a large number of mechanical devices in factories, cities, etc.; and vehicle to everything (V2X), suitable for applications of the Internet of vehicles.

A conventional network infrastructure adopts a fixed deployment method, where a fully functional apparatus is installed at a fixed spot. However, not all the installation spots and provided services need to be fully loaded from time to time. If not used effectively, the costly infrastructure will only increase the cost for construction and maintenance.

Network function virtualization (NFV) is one of the tools to achieve network slicing, known for being capable of flexibly, dynamically and quickly arranging the required network resources and radio resources in a central/cloud/local general-purpose processor/server according to characteristics and a location of the service to be provided, so as to greatly reduce the equipment cost, and meet customer needs in real-time.

In addition to virtualizing and cloudizing the network functions, in order to increase interoperability among equipment manufacturers, it is also necessary to establish standard interface specifications. From the perspective of network operators, an automated management platform and various customized services that may be dynamically set are also needed. The open-radio access network (O-RAN) alliance is an alliance mainly formed by operators and calls on equipment manufacturers to join in to jointly define an open interface and an automatic and intelligent network management framework. Referring to FIG. 1, FIG. 1 is a schematic diagram of an O-RAN framework. The framework proposed by the O-RAN alliance includes following functional blocks and supported functions: service management and orchestration SMO, non-real-time radio access network intelligent controller (non-RT RIC) RIC1, near-real-time radio access network intelligent controller (near-RT RIC) RIC2, O-RAN central unit O-CU, O-RAN distributed unit O-DU, and O-RAN radio unit O-RU.

The service management and orchestration SMO provides an O1 interface I1 and an O2 interface I2, where the O1 interface I1 is an interface used to connect various managed components, and is designed for error (fault), configuration, accounting, performance, security management (FCAPS management), and may collect performance data of a access network and users; the O2 interface I2 is an interface used to connect to an O-RAN cloud platform O-Cloud, and used to orchestrate cloud platform resources.

The non-RT RIC RIC1 provides an A1 interface I3. The A1 interface I3 is an interface for connecting the near-RT RIC RIC2. The non-RT RIC RIC1 applies an A1 policy. The A1 policy is used to set a policy transmitted to the near-RT RIC RIC2 through the A1 interface I3. The policy includes quality of service (QoS), quality of experience (QoE) and traffic steering. The non-RT RIC RIC1 may further train a machine learning model (ML model), execute the machine learning model, or configure the machine learning model to the near-RT RIC RIC2.

The near-RT RIC RIC2 executes the machine learning model and provides an E2 interface I4. The E2 interface I4 is an interface used to connect the O-RAN central unit O-CU and the O-RAN distributed unit O-DU, and is used to collect, analyze, and monitor network information and user information coming from the O-RAN central unit O-CU and the O-RAN distributed unit O-DU, and control the behaviors or parameters of the O-RAN central unit O-CU and the O-RAN distributed unit O-DU.

The O-RAN central unit O-CU, the O-RAN distributed unit O-DU, and the O-RAN radio unit O-RU support the functions of a central unit, a distributed unit and a radio unit as defined in 3GPP, and support the O1 interface I1. The O-RAN central unit O-CU may be further divided into an O-RAN central unit control plane (O-CU-CP) and an O-RAN central unit user plane (O-CU-UP). The O-RAN distributed unit O-DU and the O-RAN radio unit O-RU support an open-fronthaul interface (OFH interface) I5 defined by O-RAN.

The functions provided by the non-RT RIC RIC1 through the A1 interface I3 include a declarative policy whose contents include an influence range or scope and a policy pattern. The influence range or scope includes one or combination of a UE Id, a group-UE Id, a network slice Id, a QoS Id, and a cell Id. The policy pattern includes one or combination of QoS, QoE, and traffic steering preference. The content of QoS includes a guaranteed flow bit rate (GFBR), a maximum flow bit rate (MFBR), a priority level, and a packet delay budget (PDB). The content of QoE includes a score, an initial buffering time, a re-buffer frequency, and a stall ratio. The content of traffic steering preference includes a cell Id List, a preference, and a primary cell-or-not.

The functions provided by the near-RT RIC RIC2 through the E2 interface I4 include control over the O-RAN central unit O-CU and the O-RAN distributed unit O-DU, and an imperative policy.

Different from the fourth-generation (4G) system, the target of the 5G system is to help different types of customers, provide a variety of services, and satisfy contracts with customers and use experiences of the users under a variety of transmission technologies and the composition of heterogeneous networks.

Based on the NFV technology, with the commercial off-the-shelf hardware, different network slices may be allocated and appropriate network functions and configurations may be set according to device types or application requests to satisfy customer and user's needs while reducing the equipment cost and operating cost.

The function of slice orchestration and management of a core network end is mainly to create, set, change and delete a network slice and the VNF resources thereof, Such a function is a non-real-time wireless resource management function.

To effectively use the physical network function (PNF) and radio resources, and to cope with the changing environment with, for example, movement of devices, changes of traffic, operating statuses, accidental events, etc., it is not easy to design a suitable algorithm in advance to meet various situations. Therefore, using an automated method and resorting to real-time network analysis to adjust a network configuration in real-time to satisfy a demand target and making effective use of resources have become an issue to work on.

SUMMARY

The disclosure is directed to a resource management method, a resource management system and a workload scheduling apparatus for network slicing.

An embodiment of the disclosure provides a resource management method for network slicing, which is adapted to manage a radio resource of a terminal device and/or network slice under a radio access network (RAN). The resource management method includes the following. A service request is received. The service request is related to an application type of at least one terminal device and/or network slice under the radio access network. A monitoring report of the terminal device and/or network slice is obtained according to the service request. The monitoring report is related to a condition of the radio resource used by the terminal device and/or network slice. A usage situation of at least one slicing resource corresponding to the radio access network is analyzed based on the at least one slicing resource required by the service request and the monitoring report to predict a predicted arrangement result of the slicing resource. The slicing resource is a resource divided through network slicing. The slicing resource required by the service request is arranged according to the predicted arrangement result to transmit a corresponding setting configuration to the radio access network. The setting configuration serves to adjust the slicing resource.

An embodiment of the disclosure provides a workload scheduling apparatus adapted to manage a radio resource of a terminal device and/or network slice under a radio access network. The workload scheduling apparatus includes, but is not limited to, a communication transceiver and a processor. The communication transceiver is configured to transmit or receive data. The processor is coupled to the communication transceiver and is configured to receive a service request through the communication transceiver, obtain a monitoring report of at least one terminal device and/or network slice through the communication transceiver according to the service request, analyze a usage situation of at least one slicing resource corresponding to the radio access network based on the at least one slicing resource required by the service request and the monitoring report to predict a predicted arrangement result of the slicing resource, and arrange the slicing resource required by the service request according to the predicted arrangement result to transmit a corresponding setting configuration to the radio access network through the communication transceiver. The service request is related to an application type of the terminal device and/or network slice under the radio access network. The monitoring report is related to a condition of the radio resource used by the terminal device and/or network slice. The slicing resource is a resource divided through network slicing. The setting configuration serves to adjust the slicing resource.

An embodiment of the disclosure provides a resource management system for network slicing, which is adapted to manage a radio resource of a terminal device and/or network slice under a radio access network. The resource management system includes, but is not limited to, a network service management device and a workload scheduling apparatus. The network service management device is set in an open-radio access network framework. The workload scheduling apparatus is configured to receive a service request, obtain a monitoring report of at least one terminal device and/or network slice according to the service request, analyze a usage situation of at least one slicing resource corresponding to the radio access network based on the at least one slicing resource required by the service request and the monitoring report to predict a predicted arrangement result of the slicing resource, and arrange the slicing resource required by the service request according to the predicted arrangement result to transmit a corresponding setting configuration to the radio access network. The service request is related to an application type of the terminal device and/or network slice under the radio access network. The monitoring report is related to a condition of the radio resource used by the terminal device and/or network slice. The slicing resource is a resource divided through network slicing. The setting configuration serves to adjust the slicing resource.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
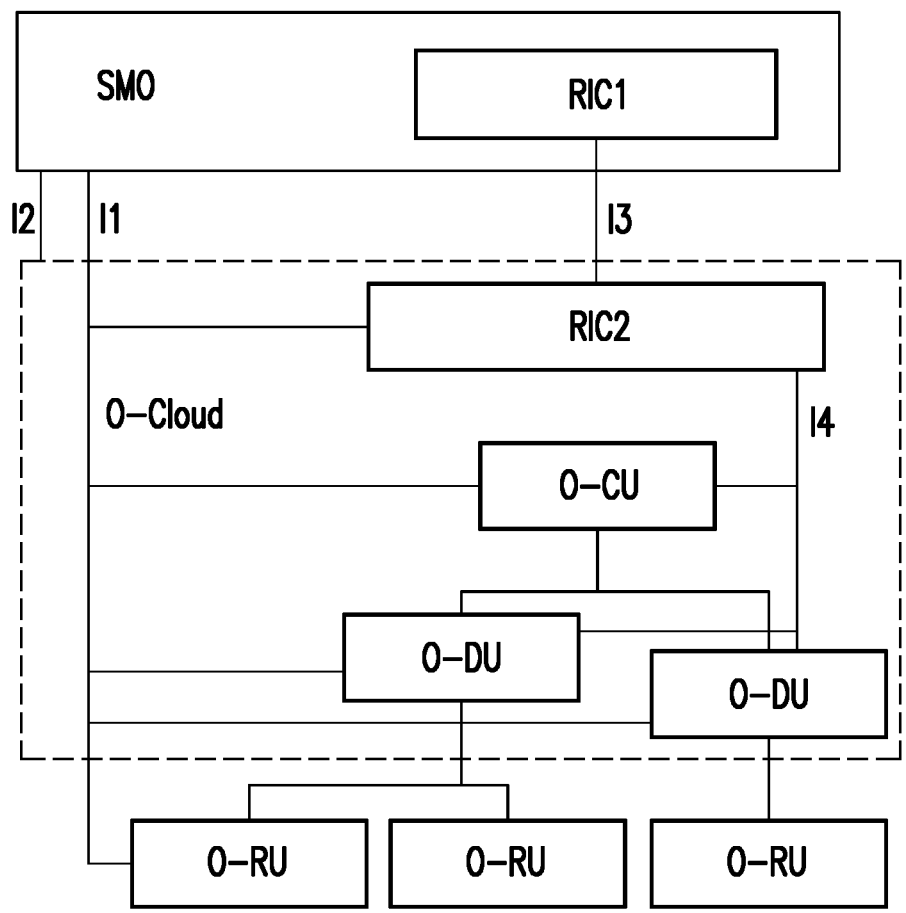
FIG. 1 is a schematic diagram of an O-RAN framework.
Figure 2:
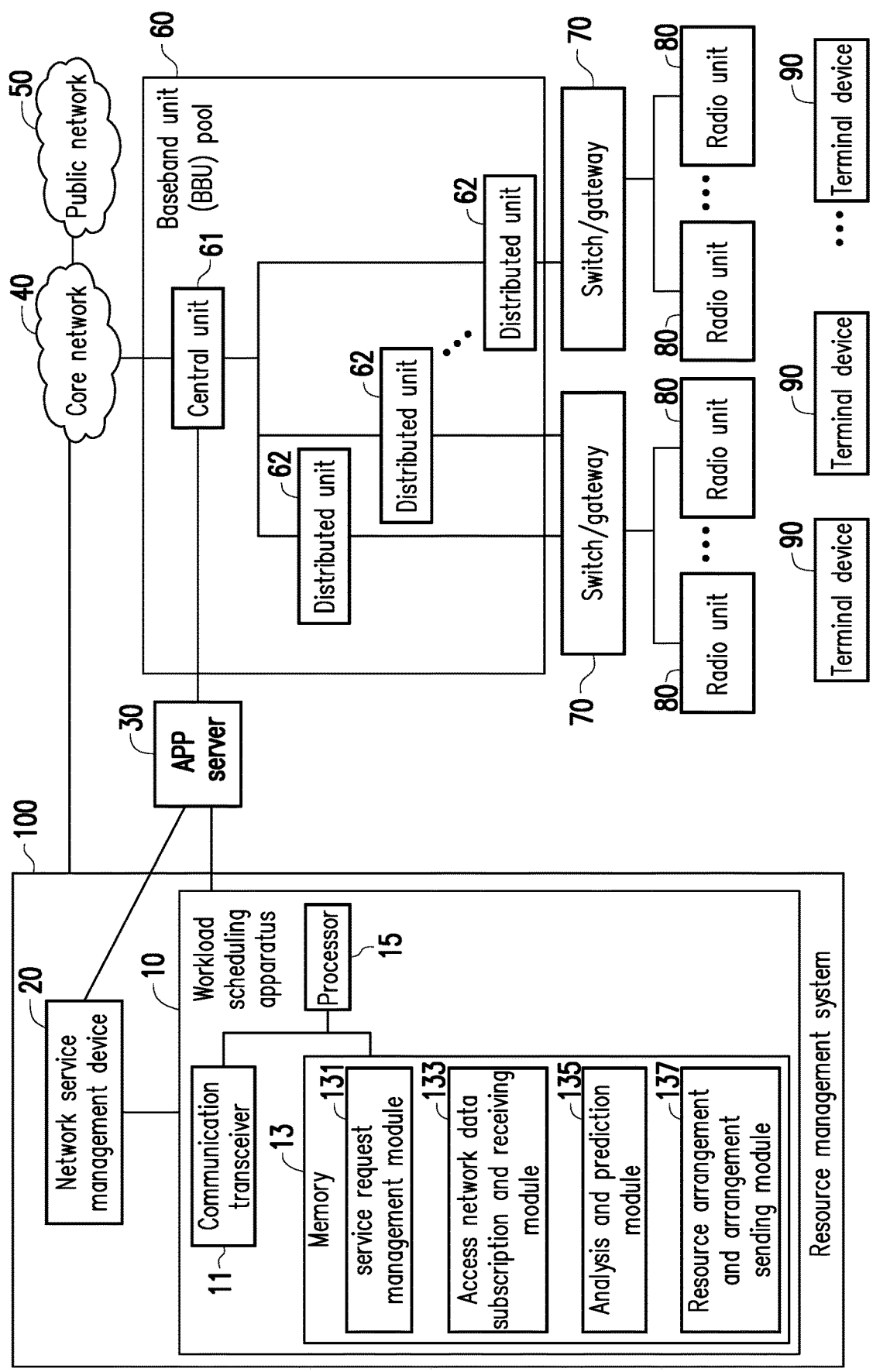
FIG. 2 is a schematic diagram of a system framework according to an embodiment of the disclosure.

FIG. 2 is a schematic diagram of a system framework 1 according to an embodiment of the disclosure. Referring to FIG. 2, a system framework 1 includes (but is not limited to) a resource management system 100, an application (APP) server 30, a core network 40, a public network 50, and a baseband unit pool (BBU pool) 60, one or a plurality of switches/gateways 70, one or a plurality of radio units 80, and one or a plurality of terminal devices 90.

The resource management system 100 includes (but is not limited to) a workload scheduling apparatus 10 and a network service management device 20. The resource management system 100 may be used for network error (fault), configuration, accounting, performance, and security (FCAPS) management, but the disclosure is not limited thereto.

The resource management system 100 is connected to the core network 40, and further controls RAN nodes (for example, one or more central units 61 and distributed units 62 in the BBU pool 60), the switches/gateways 70, the radio units 80 and the terminal devices 90 under a radio access network (RAN).

It may be a desktop computer, various types of servers, a workstation, or a background host, etc. In some embodiments, functions and/or operations of the workload scheduling apparatus 10 may be implemented by software. The workload scheduling apparatus 10 includes (but is not limited to) a communication transceiver 11, a memory 13 and a processor 15.

The communication transceiver 11 is, for example, a transceiver supporting wired networks such as Ethernet, optical fiber networks, or cables (which may include (but is not limited to) connection interfaces, signal converters, and communication protocol processing chips, etc.), and may also be a transceiver supporting wireless networks such as Wi-Fi, fourth-generation (4G), fifth-generation (5G) or later generation mobile networks, etc. (which may include (but is not limited to) antennas, digital-to-analog/analog-to-digital converters, communication protocol processing chips, etc.). In an embodiment, the communication transceiver 11 is used to transmit or receive data.

The memory 13 may be any type of a fixed or removable random access memory (RAM), a read-only memory (ROM), a flash memory or a similar component or a combination of the above components. In an embodiment, the memory 13 stores software modules (for example, a service request management module 131, an access network data subscription and receiving module 133, an analysis and prediction module 135, and a resource arrangement and arrangement sending module 137), and operations of the software modules are described detailed in subsequent embodiments.

The processor 15 is configured to process digital signals and execute programs according to exemplary embodiments of the disclosure. The functions of the processor 15 may be achieved by using a programmable unit such as a central processing unit (CPU), a microprocessor, a microcontroller, a digital signal processing (DSP) chip, a field programmable logic gate array, etc. In some embodiments, the functions of the processor 15 may also be implemented by an independent electronic device or an integrated circuit (IC), and the operations of the processor 15 may also be implemented by software. In an embodiment, the processor 15 may load and execute the software modules stored in the memory 13 to implement the method of the embodiment of the disclosure. In some embodiments, the processor 15 is in charge of some or all of the operations of the workload scheduling apparatus 10.

In an embodiment, the workload scheduling apparatus 10 is further coupled to the RAN nodes (for example, the central unit 61 and the distributed units 62 in the BBU pool 60), and provides subscription requests, policies, and a setting configuration used to control the RAN nodes to the RAN nodes, and obtain a monitoring report (including events and corresponding data) corresponding to the subscription requests, and operations thereof are described in detailed in subsequent embodiments.

The network service management device 20 is coupled to the workload scheduling apparatus 10. The workload scheduling apparatus 10 may be a desktop computer, various types of servers, a workstation, or a background host, etc. In some embodiments, the functions and/or operations of the network service management device 20 may be implemented by software.

In an embodiment, the network service management device 20 is set in an open-radio access network (O-RAN) framework, and includes a service management and orchestration (SMO) function, but the disclosure is not limited thereto.

It should be noted that in some embodiments, the workload scheduling apparatus 10 and the network service management device 20 may be integrated into a single device, or their functions may be dispersed and/or implemented on more devices or software modules.

The APP server 30 is coupled to the workload scheduling apparatus 10, the network service management device 20, and the RAN nodes (for example, the central unit 61 and the distributed units 62 in the BBU pool 60). In an embodiment, the APP server 30 provides a graphical user interface (GUI), a webpage interface or other user interfaces for the user to manage services that the workload scheduling apparatus 10 is in charge of and/or statistical data obtained by the workload scheduling apparatus 10 (for example, monitoring reports on the RAN nodes or other data).

The core network 40 is coupled to the resource management system 100. The core network 40 may be a core network supporting 4G, 5G or later generations. The core network 40 may include one or a plurality of core network entities, for example, a home subscribe server (HSS), a mobility management entity (MME), an authentication server function (AUSF) or an access and mobility management function (AMF), but the disclosure is not limited thereto. The core network 40 may be connected to the public network 50 (for example, the Internet or other networks).

The BBU pool 60 is connected to the core network 40. The central unit 61 and the distributed unit 62 in the BBU pool 60 may be collectively referred to as a home evolved node B (HeNB), an eNB, a next-generation node B (gNB), a base transceiver system (BTS), a relay, or a repeater. In some embodiments, the central unit 61 is in charge of functions of radio resource control (RRC), packet data convergence protocol (PDCP) or higher level protocol, and the distributed unit 62 is in charge of functions of radio link control (RLC), media access control (MAC) and physical (PHY) or other layers, but the disclosure is not limited thereto. It should be noted that the central unit 61 and the distributed unit 62 may be two independent devices.

The radio unit 80 is connected to the distributed unit 62 through the switch/gateway 70. In some embodiments, the radio unit 80 is in charge of functions of a digital front end (DFE) and a part of physical layer.

It should be noted that there are many implementations of the aforementioned BBU pool 60, switches/gateways 70, and radio units 80 and other RAN nodes, which may be changed due to the support of mobile networks of different generations, and are not limited by the disclosure.

The terminal device 90 may be a mobile station, an advanced mobile station (AMS), a telephone device, customer premise equipment (CPE), an on-board unit (OBU), a road side unit (RSU), various types of IoT device, automated machinery, a smart home appliance, or a wireless sensor, etc.

Taking a smart factory Internet of Things as an example, the terminal device 90 may be related to application fields such as factory automation, process automation, human-machine interaction and manufacturing, distribution and warehousing, and monitoring and maintenance. It should be noted that the application field of the terminal device 90 is not limited thereto.

In one embodiment, the terminal device 90 is within a service range of the radio unit 80 and is accordingly connected to the public network 50, other networks, or a specific server.

It should be noted that most of the terminal devices 90 may be classified into eMBB, URLLC, and mMTC according to transmission characteristics and requirements such as a transmission rate, latency, or a number of connections required by application types thereof. Taking the smart factory Internet of Things as an example, mobile robots require low-latency control and mobility. Human-machine interaction and manufacturing require (non-) periodical, two-way communication and machine stop in emergency, and monitoring and maintenance require maintenance and operation information and software/firmware update.

In an embodiment, network slicing technology is applied. The network slice is a virtual logical network, and may share physical network components (for example, the central unit 61, the distributed units 62, and the radio units 80). In some embodiments, the workload scheduling apparatus 10 may arrange appropriate virtual network functions (which are referred to as slicing resources hereinafter) according to application requests served by different network slices. Namely, one or more slicing resources are divided according to application types (for example, eMBB, URLLC, mMTC, vehicle communications, or a combination thereof) of the terminal devices 90.

Figure 3A:
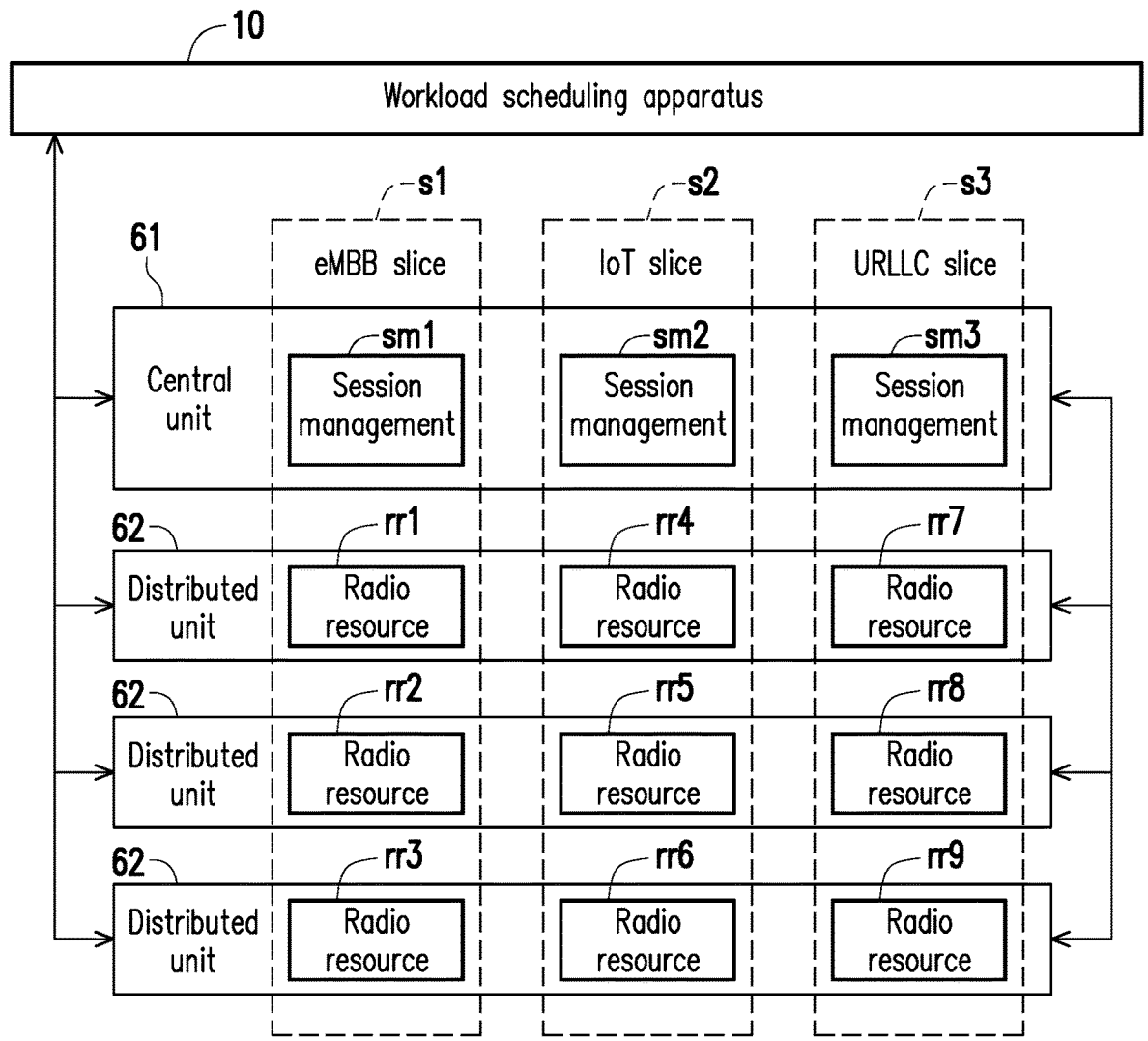
FIG. 3A is a schematic diagram of network slices according to an embodiment of the disclosure.
Figure 3A:
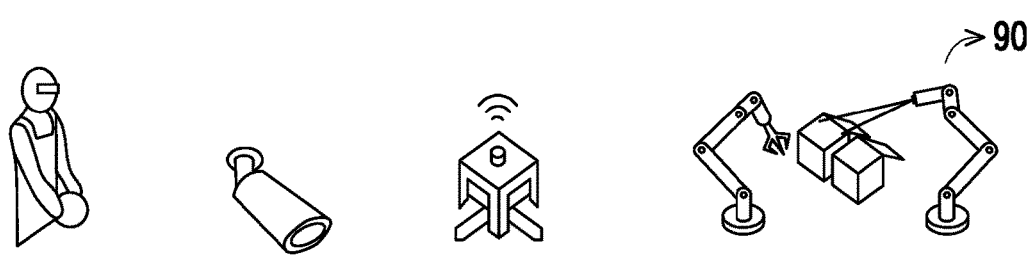

For example, FIG. 3A is a schematic diagram of network slicing according to an embodiment of the disclosure. Referring to FIG. 3A, regarding an application situation of a smart factory, three network slices s1, s2, and s3 of eMBB, URLLC and mMTC may be established on the shared central unit 61 and the distributed units 62. The network slices s1, s2, and s3 have different network functions to respectively satisfy requirements on transmission rate, latency, etc. It should be noted that functions of session management sm1, sm2, and sm3 that the central unit 61 is in charge of are also divided according to the three network slices s1, s2, and s3, and the functions of the session management sm1, sm2, and sm3 operate independently or collaboratively. Similarly, functions of radio resources rr1-rr9 that the distributed units 62 are in charge of may also be divided according to the three network slices s1, s2, and s3, and the functions of the radio resources rr1-rr9 operate independently or cooperatively.

Figure 3B:
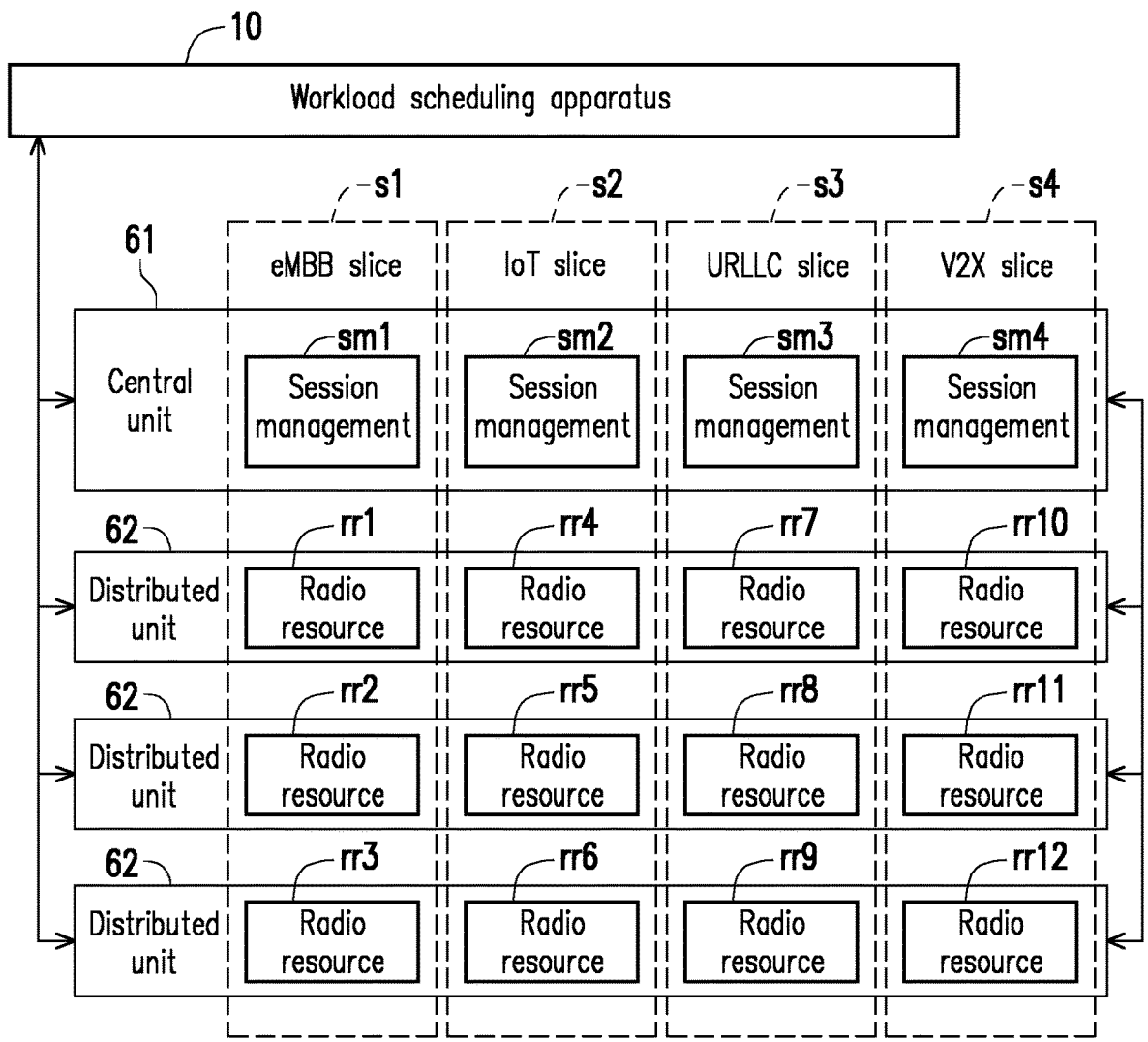
FIG. 3B is a schematic diagram of network slices according to another embodiment of the disclosure.
Figure 3B:

FIG. 3B is a schematic diagram of network slicing according to another embodiment of the disclosure. Referring to FIG. 3B, regarding an application situation of smart transportation (which is related to, for example, monitors, traffic signs, pedestrians and vehicles), fourth network slices s1-s4 of eMBB, URLLC, mMTC and V2X may be established on the shared central unit 61 and the distributed units 62. Similarly, the network slices s1-s4 respectively have different network functions, the central unit 61 is divided into functions of session management sm1-sm4, and the distributed units 62 are divided into functions of radio resources rr1-rr12.

In order to facilitate easy understanding of an operation flow of the embodiment of the disclosure, some embodiments are provided below to describe the operation flow of each device in the system framework 1 of the embodiment of the disclosure in detail.

Figure 4:
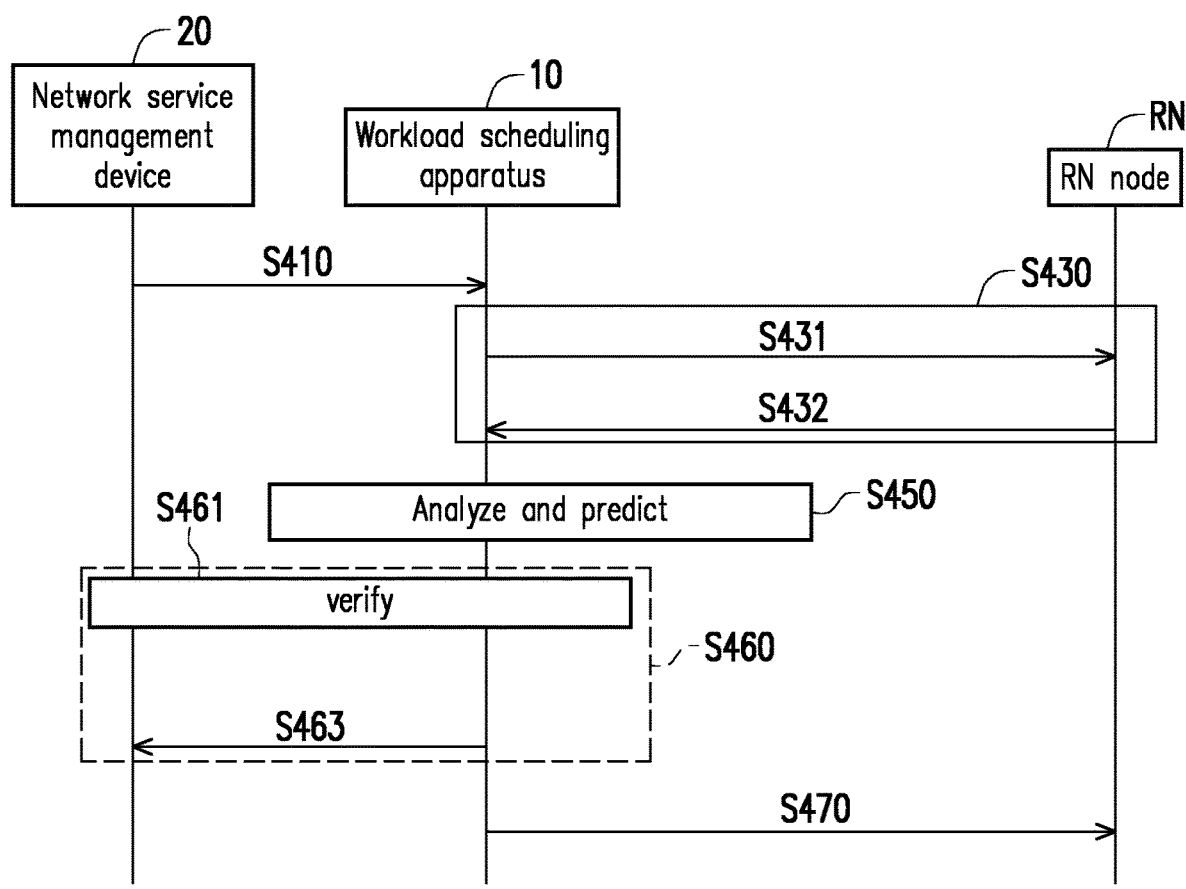
FIG. 4 is a flowchart of a resource management method according to an embodiment of the disclosure.

FIG. 4 is a flowchart of a resource management method according to an embodiment of the disclosure. Referring to FIG. 4, the processor 15 (executing the service request management module 131) of the workload scheduling apparatus 10 receives a service request from the network service management device 20 through the communication transceiver 11 (step S410). To be specific, the service request is related to an application type of one or a plurality of terminal devices 90 under the radio access network. The application type is, for example, related to eMBB, URLLC, mMTC, vehicle communications, or a combination thereof. For example, in the case of wide area coverage of eMBB, seamless coverage and higher mobile speed are the main requests, and a data transmission rate thereof must also be higher than the existing data transmission rate; and in case of an application of hot spots, there is a lower demand on mobility, but a very high data transmission amount is often required. Therefore, the data transmission rate of such type of the terminal device 90 is higher than that of the terminal device 90 of the wide area coverage. For another example, URLLC has stricter demands on data transmission amount, latency and reliability. For still another example, mMTC will be connected to a large number of devices, which has a low amount of sending data and has a lower demand on latency of transmission data.

In an embodiment, the service request is related to a request of one or a plurality of targets on QoS under the corresponding application type. Such target is, for example, one or a plurality of service flows, one or a plurality of terminal devices, one or a plurality of cells, one or a plurality of slicing resources, or a combination thereof. In some embodiments, the service request may be for the target of a specific model, type, service, quantity, event, or area. For example, the service request includes a service flow identification code, a device identification code (of the terminal device 90), a slicing identification code (of the slicing resource), a cell identification code (of the central unit 61, the distributed unit 62, the switch/gateway 70, and/or the radio unit 80), or a combination thereof, which is used to specify a specific object.

QoS is related to transmission characteristics and request constraints, for example, the lowest bit rate (for example, an image request), the lowest data transmission delay (for example, a device control instruction, or an emergency notification instruction), etc.

In some embodiments, the service request may further include a specific time point and a length of a service period. In addition, in other embodiments, the service request may be from other network management related servers.

The processor 15 (executing the access network data subscription and receiving module 133) obtains a monitoring report related to one or a plurality of the terminal devices 90 through the communication transceiver 11 and according to the service request (step S430). To be specific, the monitoring report is related to a condition of the radio resource used by the terminal device 90. In some embodiments, the processor 15 subscribes the monitoring report to the radio access network through the communication transceiver 11 (step S431). The monitoring report includes one or a plurality of monitoring items, and the monitoring items are related to a monitored object, a resource usage condition, a number of connections, a traffic, and/or event content.

The monitored object is an object corresponding to the service request, and a coverage range thereof includes cell identification codes, slice identification codes, and service flow identification codes. The resource usage condition is related to radio resources (for example, specific physical resource blocks (PRB)) provided by uplink (UL) and/or downlink (DL) of a cell and/or slice. The number of connections is related to the number of the terminal devices 90 served by one or more cells and/or slices. The traffic is related to a traffic of uplink and/or downlink packets coming from and/or transmitted to the cells and/or slices. The event content is related to a specific triggered event. The event is, for example, a traffic threshold added to the traffic of a specific slice or service flow (for example, the URLLC slice s3, or an emergency flow type). Therefore, the monitoring item is the resource usage condition, the number of connections, the traffic, and/or the event content corresponding to the monitored object.

In an embodiment, the processor 15 receives the monitoring report from the radio access network through the communication transceiver 11 (step S433). The monitoring report is data obtained based on the aforementioned monitoring items or a detection result of event trigger, for example, a coverage range, a number of the terminal devices 90 served by one or more cells, a number of the terminal devices 90 served by one or more slices, an uplink traffic transmission amount and/or receiving amount of the cell, a downlink traffic transmission amount and/or receiving amount of the cell, an uplink traffic transmission amount and/or receiving amount of the slice, a downlink traffic transmission amount and/or receiving amount of the slice, an uplink resource usage amount of the cell, a downlink resource usage amount of the cell, an uplink resource usage amount of the slice, a downlink resource usage amount or event of the slice. The event may be a traffic threshold added by crossing a specific slice or a specific service flow.

In some embodiments, without considering a bandwidth/traffic limitation, the workload scheduling apparatus 10 may also subscribe all or a part of fixed monitoring items. In an embodiment, the monitoring reports may be stored in the memory 13 or other database. In another embodiment, the monitoring reports may be output to a virtualized application of a network status through an external transmission interface.

The processor 15 (executing the analysis and prediction module 135) analyzes a usage situation of at least one slicing resource corresponding to the radio access network based on the at least one slicing resource required by the service request and the monitoring report, so as to predict a predicted arrangement result of the slicing resource (step S450). To be specific, the slicing resource is a resource divided through network slicing, for example, the hardware, software functions or radio resources corresponding to the network slices s1-s4 shown in FIG. 3A and FIG. 3B. It is assumed that the terminal device 90 has been configured to be served by a network slice of a specific application type, and uses a specific slicing resource for communication. The movement or other emergencies of the terminal device 90 (for example, excessive reports received due to abnormal conditions, emergency high-definition video scheduling for disasters or injuries, temporary suspension orders for a large number of devices, or changes of working traffic and data type in different working hours and different areas, etc.) may cause a change in information traffic, and insufficiency of the number of the set radio resources, which leads to decrease of the transmission quality of itself or other usage situations. Therefore, a near real-time analysis and response mechanism is required to avoid affecting the normal operation of various application types. The workload scheduling apparatus 10 may monitor an actual situation of the radio access network in real-time, and accordingly respond a solution quickly.

In an embodiment, the processor 15 performs analysis and prediction through an inference model. The inference model is constructed based on a machine learning algorithm (for example, a convolution neural network (CNN), a recurrent neural network (RNN), or a deep belief network, etc.) or other types of algorithms. An input of the inference model is the service request and the monitoring report, and an output of the inference model is the predicted arrangement result. The predicted arrangement result may be related to a required network resource amount, an expected cell load (for example, the number of connections, the resource blocks, etc.), a predicted QoS, or a combination thereof. In an embodiment, the predicted arrangement result may further include a prediction of QoS.

In some embodiments, the APP server or the network service management device 20 may manage (for example, modify, add, deploy, or delete) the inference model.

In an embodiment, the workload scheduling apparatus 10 may verify the predicted arrangement result (step S460). The processor 15 may verify whether the predicted arrangement result satisfies the service request (step S461). For example, a historical monitoring report stored in the memory 13 or the database is used to confirm whether the service request is satisfied. The processor 15 provides a feedback to the network service management device 20 or other network management-related servers through the communication transceiver 11 according to a verification result of the service request (step S463). For example, a notification indicating that the service request is not satisfied is fed back to the network service management device 20. For another example, the event trigger is fed back to the network service management device 20.

The processor 15 (executing the resource arrangement and arrangement sending module 137) may arrange one or more slicing resources required by the service request according to the predicted arrangement result, so as to transmit a corresponding setting configuration to the radio access network through the communication transceiver 11 (step S470). To be specific, the setting configuration is used to adjust the slicing resources. For example, the processor 15 determines the setting configuration (i.e., the content of the arrangement) to be related to a scheduling priority of one or more service flows of slices and/or one or more cells, a resource amount of one or more service flows and/or one or more cells, a number of radio resource blocks, a size of a bandwidth part (BWP), an allowable signal strength or an allowable signal quality, active or inactive (for example, sleep or standby) of one or more cells, or a handover threshold. The setting configuration may be used by the RAN nodes RN to accordingly perform corresponding operations, for example, to change a slicing order, increase/decrease the resource amount, increase the size of bandwidth part, decrease the allowable signal strength, etc.

Figure 5:
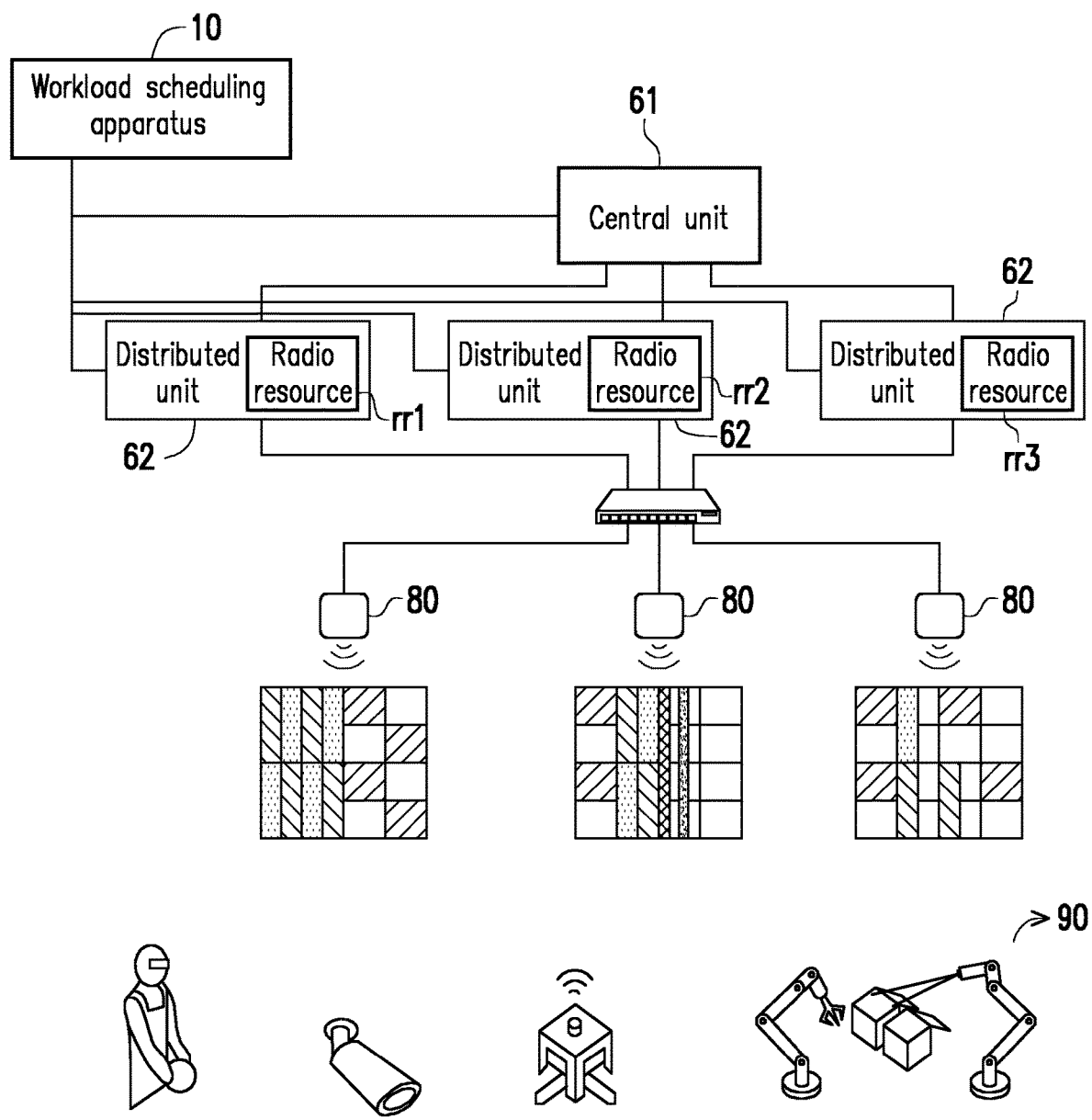
FIG. 5 is a schematic diagram of radio resource arrangement according to an embodiment of the disclosure.

In an embodiment, the central unit 61 or the distributed unit 62 changes the radio resource of a specific slice or switches the radio resources of a plurality of slices according to the setting configuration. For example, FIG. 5 is a schematic diagram of radio resource arrangement according to an embodiment of the disclosure. Referring to FIG. 5, according to required characteristics of the application types of different terminal devices 90, the workload scheduling apparatus 10 may respectively arrange the radio units 80 with different radio resource parameters (for example, a transmission time interval (TTI) (corresponding to a horizontal axis of the radio resources) and a subcarrier spacing (SCS) (corresponding to a vertical axis of the radio resources), and a number of the radio resource blocks) for different slices, i.e., to arrange different slicing resources to different application types.

Different application situations are provided below for further description. In an embodiment, the service request is related to a request of one or a plurality of targets (for example, a specific service flow, the terminal devices 90, cells, and/or slices) on QoS (for example, the minimum lowest bit rate, the minimum data transmission delay, etc.) under the corresponding application type. For example, in case of an application situation of adjusting/increasing an image resolution of a part of cameras in a specific area, the workload scheduling apparatus 10 may subscribe the corresponding monitoring items (for example, a usage amount of uplink physical resource blocks (PRB) of each slice, an uplink traffic of each slice, a number of the connections of each slice, a QoS level of each slice, etc.) to a specified target in the radio access network, and accordingly obtain a corresponding monitoring report. The workload scheduling apparatus 10 may take the aforementioned monitoring report and the service request (for example, the lowest bit rate) as the input of the inference model, and accordingly output the predicted arrangement result (for example, the uplink PRBs allocated to each slice, the maximum number of connections of each slice, etc.). The arrangement generated by the processor 15 is about to make the setting of the target to satisfy the request of QoS. For example, the setting configuration of a specific format (conformed to the RAN nodes RN to be controlled) is to set the number of the uplink PRBs and the maximum number of connections (i.e., the allowable number) of each slice. It should be noted that if the current number of connections of a certain slice is greater than the maximum number of connections, the setting configuration may be a handover decision (for example, the lowest signal strength of a specific device identification code in the slice). Moreover, regarding the request of QoS, if the number of connections required by the service request is greater than the maximum number of connections or the required number of the uplink PRBs is greater than the maximum allowable number of PRBs in the system, the workload scheduling apparatus 10 may feed back content that the service request is not satisfied to the network service management device 20.

In another embodiment, the service request is related to a notification upload restriction of one or more slices under an emergency operation. The workload scheduling apparatus 10 may subscribe event content to a specific target. The event content is, for example, a specific slice identification code and a threshold added by uploading an emergency signal within a specific time. The workload scheduling apparatus 10 may receive a monitoring report related to triggering of the specified event content. For example, the monitoring report includes the slice identification code, the event, the number of uploaded emergency signals, and the cell identification code. The workload scheduling apparatus 10 may take the aforementioned monitoring report and the service request as the input of the inference model, and accordingly output predicted downlink PRBs related to, for example, a specified slice used for emergency stop operation and downlink PRBs of other slices. The workload scheduling apparatus 10 may further provide a setting configuration setting a downlink radio resources provided by those slices. On the other hand, the workload scheduling apparatus 10 may feed back the content of the event trigger to the network service management device 20.

In summary, the resource management method, the resource management system and the workload scheduling apparatus for network slicing of the embodiments of the disclosure subscribe and obtain the monitoring report of the currently used radio resources according to the service request related to the application type, analyze and predict the arrangement of the slicing resources, and accordingly provide the corresponding setting configuration to the nodes of the radio access network. In this way, appropriate setting configurations may be quickly provided according to the requests of different application types and in response to real-time changing conditions, so as to satisfy the requirement of the service or the condition.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A resource management method for network slicing, adapted to manage a radio resource of a terminal device under a radio access network (RAN), the resource management method comprising:

receiving a service request, wherein the service request is related to an application type of at least one terminal device under the radio access network;

obtaining a monitoring report of the at least one terminal device according to the service request, wherein the monitoring report is related to a condition of the radio resource used by the at least one terminal device;

analyzing a usage situation based on at least one slicing resource required by the service request and the monitoring report to predict a predicted arrangement result of the at least one slicing resource, wherein the at least one slicing resource is a resource divided through network slicing; and arranging the at least one slicing resource required by the service request according to the predicted arrangement result to transmit a corresponding setting configuration to the radio access network, wherein the setting configuration serves to adjust the at least one slicing resource, wherein the service request is related to a notification upload restriction of at least one slice under an emergency operation, and the step of arranging the at least one slicing resource required by the service request according to the predicted arrangement result comprises:

setting a downlink radio resource provided by the at least one slice.

2. The resource management method for network slicing as claimed in claim 1, wherein after arranging the at least one slicing resource required by the service request according to the predicted arrangement result, the resource management method further comprises:

verifying whether the predicted arrangement result satisfies the service request; and providing a feedback based on a verification result of the service request, wherein the service request comes from a network service management device in an open-radio access network (O-RAN) framework, and the feedback is provided to the network service management device.

3. The resource management method for network slicing as claimed in claim 1, wherein after obtaining the monitoring report of the at least one terminal device according to the service request comprises:
subscribing to the monitoring report of the radio access network, wherein the monitoring report comprises at least one monitoring item, and the at least one monitoring item is related to at least one of a monitored object, a resource usage condition, a number of connections, a traffic, and an event content.

4. The resource management method for network slicing as claimed in claim 1, further comprising:
dividing the at least one slicing resource according to the application type of the at least one terminal device, wherein the application type comprises enhanced mobile broadband (eMBB) communications, ultra-reliable and low latency communications (URLLC), massive machine type communications (mMTC), vehicle communications, or a combination thereof.

5. The resource management method for network slicing as claimed in claim 1, wherein analyzing the usage situation of the at least one slicing resource corresponding to the radio access network based on the at least one slicing resource required by the service request and the monitoring report to predict the predicted arrangement result of the at least one slicing resource comprises:
analyzing and predicting through an inference model, wherein the inference model is constructed based on a machine learning algorithm, an input of the inference model is the service request and the monitoring report, an output of the inference model is the predicted arrangement result, and the predicted arrangement result is related to a required network resource amount, an expected cell load, a predicted quality of service, or a combination thereof.

6. The resource management method for network slicing as claimed in claim 1, wherein the service request is related to a request of quality of service of at least one target under the corresponding application type, the at least one target is at least one service flow, the at least one terminal device, at least one cell, at least one slice or a combination thereof, and arranging the at least one slicing resource required by the service request according to the predicted arrangement result comprises:
making a setting of the at least one target satisfying the request of quality of service.

7. The resource management method for network slicing as claimed in claim 6, wherein the predicted arrangement result is related to that a number of connections of the slice is greater than an allowable number of the connections of the slicing, and arranging the at least one slicing resource required by the service request according to the predicted arrangement result comprises:
determining the setting configuration to be related to a scheduling priority of slices of at least one of the at least one service flow and the at least one cell, a resource amount of at least one of the at least one service flow and the at least one cell, a number of radio resource blocks, a size of a bandwidth part (BWP), an allowable signal strength or an allowable signal quality, active or inactive of the at least one cell, or a handover threshold.

8. A workload scheduling apparatus, adapted to manage a radio resource of a terminal device under a radio access network, the workload scheduling apparatus comprising:
a communication transceiver, transmitting or receiving data; and
a processor, coupled to the communication transceiver, and configured to:
receive a service request through the communication transceiver, wherein the service request is related to an application type of at least one terminal device under the radio access network;
obtain a monitoring report of the at least one terminal device through the communication transceiver according to the service request, wherein the monitoring report is related to a condition of the radio resource used by the at least one terminal device;
analyze a usage situation based on at least one slicing resource required by the service request and the monitoring report to predict a predicted arrangement result of the at least one slicing resource, wherein the at least one slicing resource is a resource divided through network slicing; and
arrange the at least one slicing resource required by the service request according to the predicted arrangement result to transmit a corresponding setting configuration to the radio access network through the communication transceiver, wherein the setting configuration serves to adjust the at least one slicing resource,
wherein the service request is related to a notification upload restriction of at least one slice under an emergency operation, and the processor is further configured to:
set a downlink radio resource provided by the at least one slice.

9. The workload scheduling apparatus as claimed in claim 8, wherein the processor is further configured to:
verify whether the predicted arrangement result satisfies the service request; and
provide a feedback through the communication transceiver based on a verification result of the service request, wherein the service request comes from a network service management device in an open-radio access network framework, and the feedback is provided to the network service management device.

10. The workload scheduling apparatus as claimed in claim 8, wherein the processor is further configured to:
subscribe to the monitoring report of the radio access network through the communication transceiver, wherein the monitoring report comprises at least one monitoring item, and the at least one monitoring item is related to at least one of a monitored object, a resource usage condition, a number of connections, a traffic, and an event content.

11. The workload scheduling apparatus as claimed in claim 8, wherein the processor is further configured to:
divide the at least one slicing resource according to the application type of the at least one terminal device, wherein the application type comprises enhanced mobile broadband communications, ultra-reliable and low latency communications, massive machine type communications, vehicle communications, or a combination thereof.

12. The workload scheduling apparatus as claimed in claim 8, wherein the processor is further configured to:
analyze and predict through an inference model, wherein the inference model is constructed based on a machine learning algorithm, an input of the inference model is the service request and the monitoring report, an output of the inference model is the predicted arrangement result, and the predicted arrangement result is related to a required network resource amount, an expected cell load, a predicted quality of service, or a combination thereof.

13. The workload scheduling apparatus as claimed in claim 8, wherein the service request is related to a request of quality of service of at least one target under the corresponding application type, the at least one target is at least one service flow, the at least one terminal device, at least one cell, at least one slice or a combination thereof, and the processor is further configured to:
  make a setting of the at least one target satisfying the request of quality of service.

14. The workload scheduling apparatus as claimed in claim 13, wherein the predicted arrangement result is related to that a number of connections of the slice is greater than an allowable number of the connections of the slice, and the processor is further configured to:
  determine the setting configuration to be related to a scheduling priority of slices of at least one of the at least one service flow and the at least one cell, a resource amount of at least one of the at least one service flow and the at least one cell, a number of radio resource blocks, a size of a bandwidth part, an allowable signal strength or an allowable signal quality, active or inactive of the at least one cell, or a handover threshold.

15. A resource management system for network slicing, adapted to manage a radio resource of a terminal device under a radio access network, and comprising:
  a network service management device, set in an open-radio access network framework; and
  a workload scheduling apparatus, comprising a communication transceiver and a processor coupled to the communication transceiver, wherein the processor is configured to:
    receive a service request from the network service management device, wherein the service request is related to an application type of at least one terminal device under the radio access network;
    obtain a monitoring report of the at least one terminal device according to the service request, wherein the monitoring report is related to a condition of the radio resource used by the at least one terminal device;
    analyze a usage situation based on at least one slicing resource required by the service request and the monitoring report to predict a predicted arrangement result of the at least one slicing resource, wherein the at least one slicing resource is a resource divided through network slicing; and
    arrange the at least one slicing resource required by the service request according to the predicted arrangement result to transmit a corresponding setting configuration to the radio access network, wherein the setting configuration serves to adjust the at least one slicing resource,
  wherein the service request is related to a notification upload restriction of at least one slice under an emergency operation, and the processor is further configured to:
    set a downlink radio resource provided by the at least one slice.

* * * * *